United States Patent
Der Lieck et al.

(10) Patent No.: US 11,598,449 B2
(45) Date of Patent: Mar. 7, 2023

(54) COMPACT MULTI-STAGE CONTROL VALVE TRIM

(71) Applicant: Sempell GMBH, Korschenbroich (DE)

(72) Inventors: Jürgen Von Der Lieck, Korschenbroich (DE); Peter Ens, Korschenbroich (DE); Marc Pollmann, Korschenbroich (DE)

(73) Assignee: Sempell GMBH, Korschenbroich (DE)

( * ) Notice: Subject to any disclaimer, the term of this patent is extended or adjusted under 35 U.S.C. 154(b) by 0 days.

(21) Appl. No.: 16/931,847

(22) Filed: Jul. 17, 2020

(65) Prior Publication Data

US 2022/0018463 A1 Jan. 20, 2022

(51) Int. Cl.
*F16K 47/04* (2006.01)
*F16K 47/08* (2006.01)

(52) U.S. Cl.
CPC .............. *F16K 47/08* (2013.01); *F16K 47/04* (2013.01)

(58) Field of Classification Search
CPC .................................. F16K 47/08; F16K 47/04
See application file for complete search history.

(56) References Cited

U.S. PATENT DOCUMENTS

| | | | | |
|---|---|---|---|---|
| 3,529,628 A * | 9/1970 | Cummins | ............... | F16K 47/08 137/625.3 |
| 3,780,767 A * | 12/1973 | Borg | ....................... | F16K 47/08 137/625.3 |
| 3,917,221 A * | 11/1975 | Kubota | .................. | F16K 47/08 251/127 |
| 3,954,124 A * | 5/1976 | Self | .......................... | F16K 3/34 138/42 |
| 3,977,435 A * | 8/1976 | Bates | ....................... | F16K 3/34 137/625.3 |
| 4,108,210 A * | 8/1978 | Luthe | ..................... | F16K 47/08 137/625.28 |
| 4,384,592 A * | 5/1983 | Ng | ............................ | F16K 3/34 137/625.3 |
| 4,398,563 A * | 8/1983 | Kay | ......................... | F16K 3/34 137/625.3 |

(Continued)

OTHER PUBLICATIONS

International Search Report and Written Opinion for PCT/IB2021/000482, filed Jul. 15, 2021.

*Primary Examiner* — Craig M Schneider
*Assistant Examiner* — Christopher D Ballman
(74) *Attorney, Agent, or Firm* — Marshall, Gerstein & Borun LLP

(57) ABSTRACT

A control valve a body having a fluid inlet and a fluid outlet and a valve seat between the fluid inlet and the fluid outlet. A valve plug is positioned within the body and movable between a closed position, in which the valve plug sealingly engages the valve seat, and an open position, in which the valve plug is spaced away from the valve seat. A cage is disposed within the body adjacent the valve seat. The cage includes a cage wall having a throttling inlet and a throttling outlet, which are connected by a throttling passageway. The throttling passageway has a radial direction, an axial direction, and an angular direction between the throttling inlet and the throttling outlet. The passageway includes a plurality of vena contracta and a plurality of pressure recovery chambers, which form a plurality of pressure reducing stages.

25 Claims, 3 Drawing Sheets

(56) References Cited

U.S. PATENT DOCUMENTS

| | | | |
|---|---|---|---|
| 4,473,210 A * | 9/1984 | Brighton | F16K 47/045 137/625.3 |
| 4,860,993 A * | 8/1989 | Goode | F16K 47/08 251/127 |
| 4,921,014 A * | 5/1990 | Tartaglia | F16K 47/08 137/494 |
| 4,938,450 A * | 7/1990 | Tripp | F16K 47/04 251/30.03 |
| 5,018,703 A * | 5/1991 | Goode | F16K 47/08 137/625.3 |
| 5,020,571 A * | 6/1991 | Tartaglia | F16K 47/08 137/625.3 |
| 6,244,297 B1 * | 6/2001 | Baumann | F16K 47/08 137/625.3 |
| 6,394,134 B1 * | 5/2002 | Kwon | F16K 47/08 137/625.3 |
| 7,069,950 B1 * | 7/2006 | Bittner | F16K 47/08 137/625.37 |
| 7,802,592 B2 * | 9/2010 | McCarty | F16K 47/08 138/42 |
| 8,863,776 B2 * | 10/2014 | Grace | F16K 3/24 137/625.3 |
| 8,950,431 B2 * | 2/2015 | Kim | F16K 47/08 137/625.33 |
| 9,528,632 B2 * | 12/2016 | Glaun | B33Y 10/00 |
| 9,677,687 B2 * | 6/2017 | Yli-Koski | F16L 55/02781 |
| 9,851,013 B2 * | 12/2017 | Zhou | F16K 47/08 |
| 10,458,555 B2 * | 10/2019 | McCarty | F16K 47/08 |
| 10,697,561 B2 * | 6/2020 | McCarty | F16L 55/033 |
| 10,711,937 B2 * | 7/2020 | Gabriel | F16L 55/02781 |
| 10,900,591 B2 * | 1/2021 | Gabriel | F16K 3/34 |
| 2005/0199298 A1 * | 9/2005 | Farrington | F16K 47/08 137/625.37 |
| 2007/0028977 A1 * | 2/2007 | Goulet | F15D 1/0015 137/809 |
| 2008/0210326 A1 * | 9/2008 | Goulet | F16K 47/08 138/43 |
| 2009/0026395 A1 * | 1/2009 | Perrault | F16K 47/08 251/127 |
| 2009/0183790 A1 * | 7/2009 | Moore | B22F 10/20 137/597 |
| 2016/0341335 A1 * | 11/2016 | Adams | F16K 3/246 |
| 2017/0067579 A1 | 3/2017 | Glaun | |
| 2017/0138507 A1 * | 5/2017 | Kluz | F16K 47/08 |
| 2017/0234440 A1 * | 8/2017 | Detmers | F16K 3/267 251/118 |
| 2018/0340643 A1 | 11/2018 | Gabriel et al. | |
| 2019/0101228 A1 | 4/2019 | Gabriel et al. | |
| 2020/0041036 A1 | 2/2020 | Sun et al. | |
| 2020/0072383 A1 * | 3/2020 | Gabriel | F16K 47/08 |

* cited by examiner

COMPACT MULTI-STAGE CONTROL VALVE TRIM

FIELD OF THE DISCLOSURE

The disclosure relates generally to control valves and, more particularly, compact multi-stage control valve trims.

BACKGROUND

Control valves are commonly used in processes to control the flow of a fluid (e.g., a gas, a liquid, etc.) or any other substance through pipes and/or vessels to which they are connected. A control valve typically includes one or more fluid inlets and fluid outlets, and control valves can also include a fluid control element or member (e.g., a valve gate, a piston, a valve plug, a control member, etc.) that operates to control fluid flow through apertures that fluidly couple the inlet(s) to the outlet(s). A control member is typically coupled to a valve bonnet that is mechanically coupled (e.g., bolted, clamped, threaded into, etc.) to the valve body. The control member is usually configured to engage a sealing structure (e.g., a valve seat) that encompasses a flow path through the valve. A regulator is a self-controlling form of a control valve.

Generally speaking, the control elements (including the fluid control member, the seat, and a cage) are known as "valve trim" or "trim assembly" in the art. In some cases it may be desirable to characterize fluid as it flows through the valve, for example, to reduce pressure or to reduce cavitation. In these cases, a trim assembly may be used that includes a cage with a plurality of openings that are drilled, cast, punched, machined etc., through a wall of the cage. The openings may be sized and shaped to characterize fluid flow as the fluid flows through the openings in the cage, for example by decreasing pressure as the fluid moves through the valve trim. This characterization or pressure reducing process generates unwanted noise. Currently, cavitation is controlled by using pressure drops and sound reduction is done by cages having a plurality of holes drilled, cast, punched, machined, etc., into a cage wall.

Referring now to FIG. 1, a typical prior art control valve 10 is illustrated. The control valve 10 generally includes a valve body 12 having an inlet 14 and an outlet 16 and a passageway 18 disposed between the inlet 14 and the outlet 16. A valve seat 24 is disposed in the passageway 18 between the inlet 14 and the outlet 16 and a cage 22 is disposed within the valve body 12 adjacent the valve seat 24. A fluid control member, such as a valve plug 26, is positioned within the body 12 and movably disposed within the cage 22. The valve plug 26 interacts with the valve seat 24 to control fluid flow through the body 12, such that the valve plug 26 sealingly engages the valve seat 24 in a closed position and is spaced away from the valve seat 24 in an open position. A stem 28 is connected to the valve plug 26 at one end and to an actuator 30 at another end. Actuator 30 controls movement of the valve plug 26 within the cage 22. The cage 22 is positioned adjacent to the valve seat 24 and proximate the valve plug 26 to provide guidance for the valve plug 26 as the valve plug 26 moves within the cage 22.

In some fluid applications, the cage 22 includes a plurality of passages or openings 20 formed through a circumferential wall of cage 22. The openings 20 function to reduce the noise produced as the fluid passes through the cage 22. The passages 20 are spaced such that jets of fluid that are produced as the fluid exits the passages 20 do not converge to produce noise. The cage 22 may be oriented in a "flow up" orientation (e.g., the fluid enters the center of the cage 22 from the bottom in FIG. 1 and passes from an inside surface to an outside surface of the cage 22) and the spacing of the passages 20 reduces the noise at the outer surface of the cage 22, or in a "flow down" orientation. The spacing of the passages 20 on the inner surface of the cage 22 meters fluid flow to pass through the desired number of passages 20 for a given valve plug 26 position to characterize the fluid flow throughout the travel of the valve plug 26.

For cages 22 used in fluid applications where the process conditions produce cavitation or noise as the gas flows through control valve 10, holes are individually drilled through the circumferential wall of cage 22 to form the passages 20. However, drilled hole cages are very cumbersome, time consuming, and costly to produce. Some drilled hole cages may contain thousands of holes and the only real feasible way to produce passages 20 drill each passage 20 individually drill bit. Acceptance criteria exists that allows a percentage of drill bits to break and be left in the cage and this process requires the use of special drilling machines that have a high degree of accuracy.

In addition to the spacing of the passages 20 on the outer surface of the cage 22, noise can also be reduced by providing other types of flow passages 20, such as by varying a cross-sectional diameter of the passages 20. However, with drilled holes through a solid cage 22, creating passages 20 having a non-linear flow path or having a variable cross-sectional area is very difficult.

In addition to the noise issues, in some liquid applications conditions can occur that will produce a condition where the liquid cavitates, which can cause damage to components of the control valve 10. In order to reduce cavitation to the point that it does not damage control valve 10 or to direct cavitation to an area that is less susceptible to damage, passages that decrease in diameter in the direction of fluid flow can be used.

However, drilling holes by conventional manufacturing techniques to create the passages 20 in the cage 22 wall requires that the holes be step drilled from the outer surface of the cage, which limits the holes to having a larger diameter portion at the outer surface of cage 22 and a smaller diameter portion of passage 20 at the inner surface of cage 22, since the holes must be drilled from the outside of cage 22.

Some existing cages 22 may include a pressure reduction or throttling stage. Each throttling stage includes a "vena contracta", where the free flow area is minimal and pressure is converted into velocity, and a subsequent, comparatively larger volume, where the kinetic energy of the fluid is, to a large degree, dissipated via turbulence; the remaining fraction leads to what is called "pressure recovery". Especially for a water control valve, a low pressure recovery is desirable, because it reduces the danger of cavitation.

In existing cage designs, these throttling stages may be sequenced radially, resulting in a rather large outer diameter of the cage, which drives necessary body size of the valve. Other designs distribute the stages axially in the trim, yielding a rather long valve.

BRIEF SUMMARY OF THE DISCLOSURE

In accordance with one exemplary aspect, a control valve includes a body having a fluid inlet and a fluid outlet. A valve seat is positioned in a passageway of the body between the fluid inlet and the fluid outlet. A valve plug is positioned within the body and movable between a closed position, in which the valve plug sealingly engages the valve seat, and an open position, in which the valve plug is spaced away from the valve seat. A cage is disposed within the body adjacent the valve seat, the cage providing longitudinal guidance for the valve plug as the valve plug moves longitudinally within the cage. The cage includes a cage wall having a throttling inlet and a throttling outlet, which are connected by a throttling passageway. The throttling passageway has a radial direction, an axial direction, and an angular direction between the throttling inlet and the throttling outlet. The passageway includes a plurality of vena contracta and a plurality of pressure recovery chambers, which form a plurality of pressure reducing stages.

In accordance with another exemplary aspect, a cage for a control valve includes a cage wall having a throttling inlet and a throttling outlet, which are connected by a throttling passageway. The throttling passageway has a radial direction, an axial direction, and an angular direction between the throttling inlet and the throttling outlet. The passageway also includes plurality of vena contracta and a plurality of pressure recovery chambers, which form a plurality of pressure reducing stages.

In further accordance with any one or more of the foregoing exemplary aspects, a control valve or cage for a control valve may further include, in any combination, any one or more of the following preferred forms.

In one preferred form, at least one vena contracta is sharp-edged.

In another preferred form, the cage wall has a plurality of throttling inlets and a plurality of throttling outlets.

In yet another preferred form, the plurality of throttling inlets is arranged in rows.

In yet another preferred form, the plurality of throttling inlets comprises three rows.

In yet another preferred form, the plurality of throttling outlets is arranged in rows.

In yet another preferred form, the plurality of throttling outlets comprises three rows.

In yet another preferred form, the throttling inlet is diamond-shaped.

In yet another preferred form, the throttling outlet is diamond-shaped.

In yet another preferred form, the throttling passageway is chevron-shaped in cross-section.

In yet another preferred form, the throttling passageway comprises a three-dimensional succession of throttling stages.

In yet another preferred form, the cage wall is manufactured with additive manufacturing techniques.

In yet another preferred form, the throttling passageway forms three or more pressure reducing stages.

DETAILED DESCRIPTION

Although the following text discloses a detailed description of example methods, apparatus and/or articles of manufacture, the legal scope of the property right is defined by the claims. Accordingly, the following detailed description is to be construed as exemplary only and does not describe every possible example, as describing every possible example would be impractical, if not impossible. Numerous alternative examples could be implemented, using either current technology or technology developed after the filing date of this patent. Such alternative examples would still fall within the scope of the claims.

Figure 1:
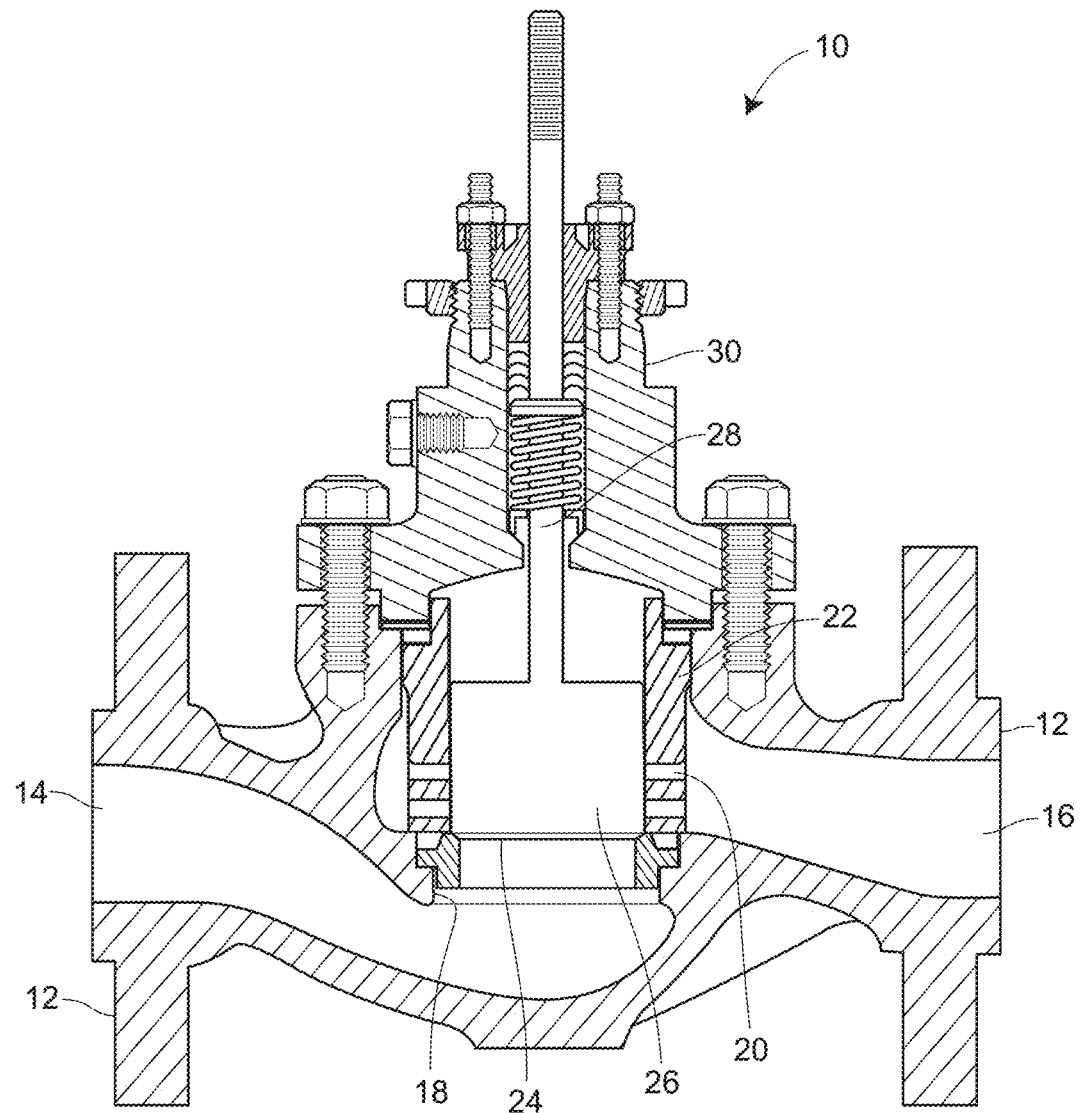
FIG. 1 is a cross-sectional view of a prior art control valve.
Figure 2:
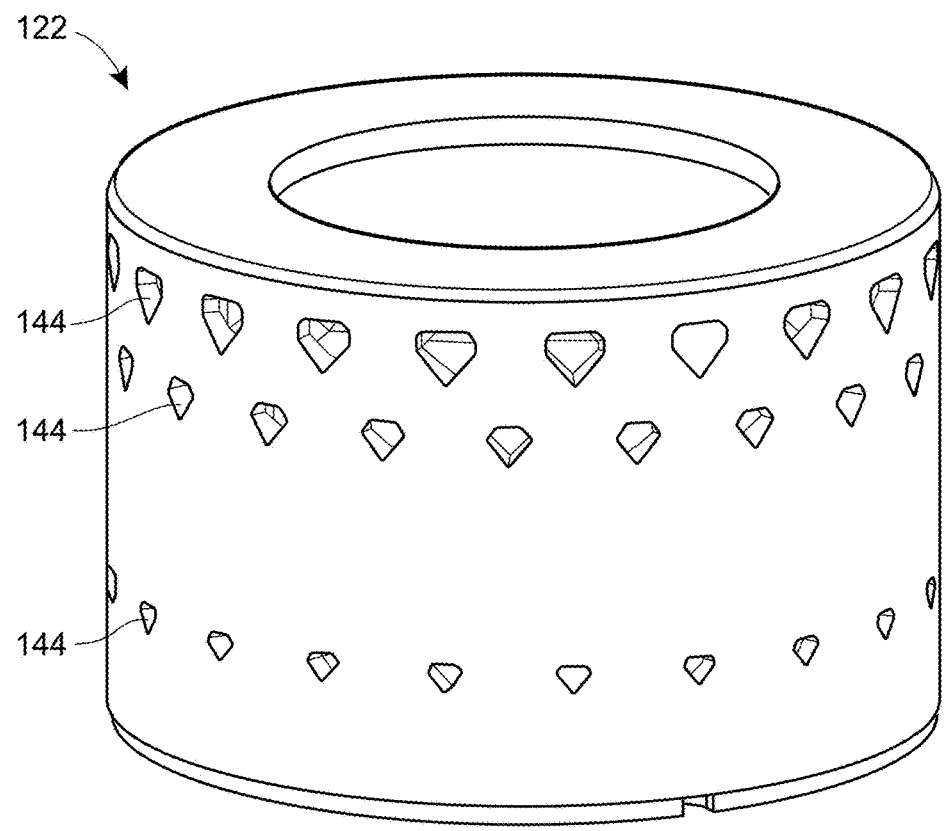
FIG. 2 is a perspective view of a cage constructed in accordance with the teachings of the disclosure.

Turning now to FIG. 2, one example of a cage 122 is illustrated. The example cage 122 may be used in a control valve, such as the control valve of FIG. 1, by replacing the cage 22 of FIG. 1. As illustrated in FIG. 1, the control valve 10 would include a body 12 having a fluid inlet 14 and a fluid outlet 16. A valve seat 24 would be positioned in a passageway 18 of the body 12 between the fluid inlet 14 and the fluid outlet 16. A valve plug 26 would be positioned within the body 12 and movable between a closed position, in which the valve plug 26 sealingly engages the valve seat 24, and an open position, in which the valve plug 26 is spaced away from the valve seat 24.

Figure 3:
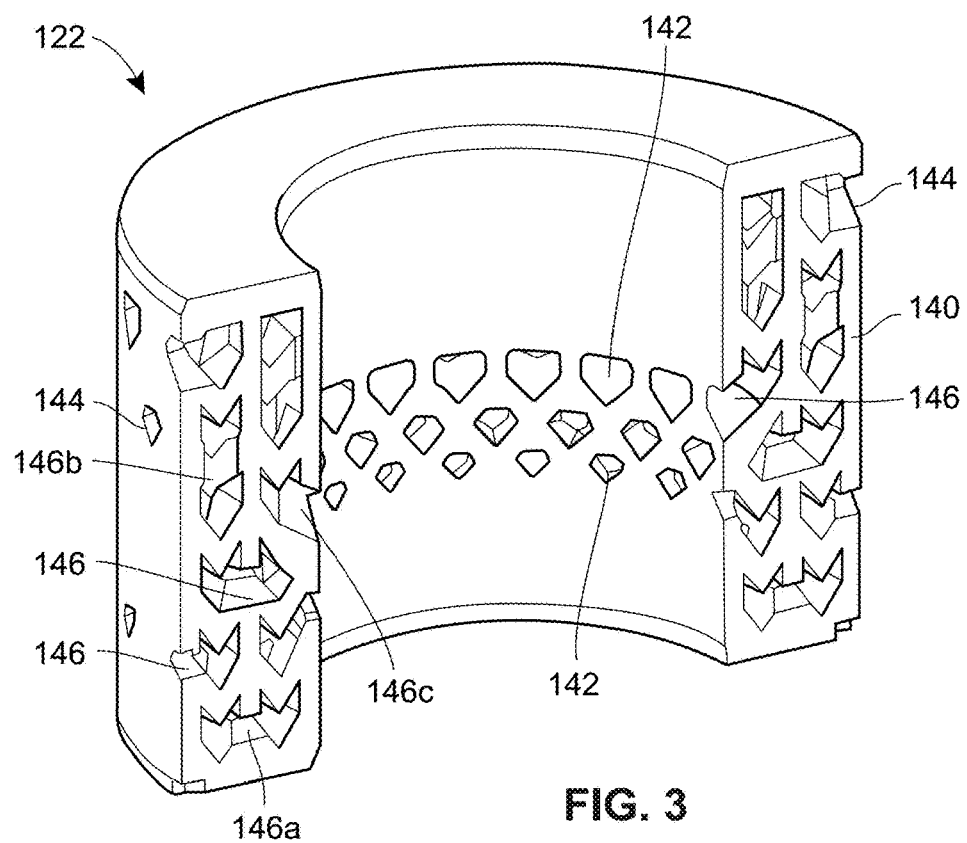
FIG. 3 is a cutaway perspective view of the cage of FIG. 2.
Figure 4:
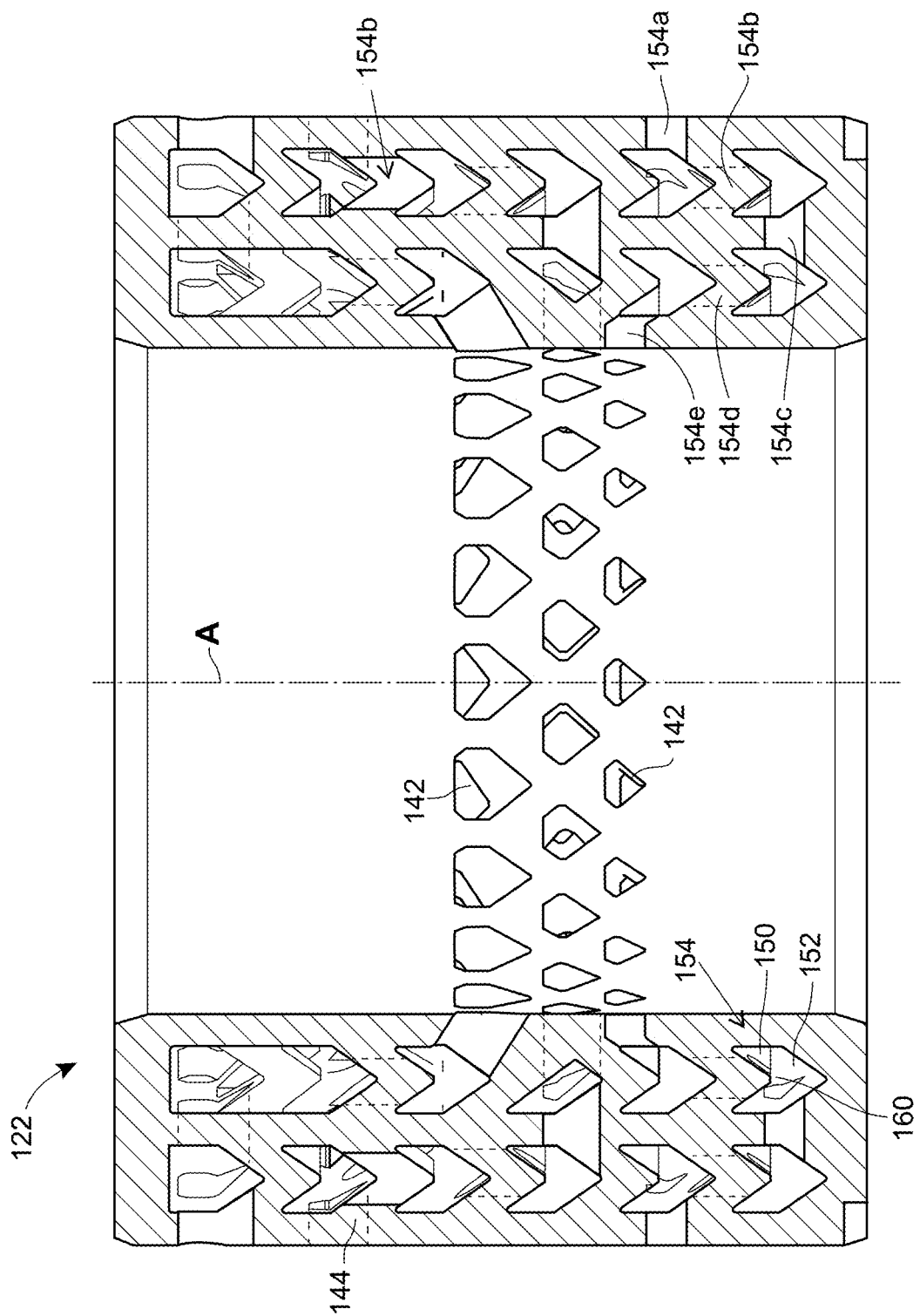
FIG. 4 is a side cut-away view of the cage of FIG. 2.

The cage 122 is disposed within the body adjacent the valve seat and the cage 122 provides longitudinal guidance for the valve plug, as described above. As illustrated in FIGS. 2-4, the cage 122 includes a cage wall 140 having a throttling inlet 142 and a throttling outlet 144, which are connected by a throttling passageway 146.

The throttling passageway 146 has a radial direction or portion 146a, an axial direction or portion 146b, and an angular direction or portion 146c between the throttling inlet 142 and the throttling outlet 144. The throttling passageway 146 includes a plurality of vena contracta 150 and a plurality of pressure recovery chambers 152, which form a plurality of pressure reducing stages 154.

In the illustrated example, there are five pressure reducing stages 154a, 154b, 154c, 154d, 154e, each stage being part of a single throttling passageway 146. In some cases, the pressure reducing stages 154 have an angular portion (e.g., 154e bottom right in FIG. 4), in other cases, the pressure reducing stages 154 have a vertical or axial portion (e.g., 154b and 154d bottom right in FIG. 4), and in other cases, the pressure reducing stages 154 have a radial portion (e.g., 154c and 154a bottom right in FIG. 4). By including a vertical portion, a radial portion, and an angular portion (including a radial and an axial component) in each throttling passageway 146, the disclosed cages 122 minimize axial and radial dimensions by making more efficient use of the volume of the cage wall 140.

The disclosed cages 122 are manufactured by additive manufacturing techniques, such as 3D printing, which enable the multi directional throttling passageways 146 to be produced. Such multi-directional throttling passageways 146 are not possible with conventional drilling or milling techniques. In other embodiments, the cage 122 may have more or less than four pressure reducing stages 154.

As illustrated in FIGS. 2-4, the cage wall 140 has a plurality of throttling inlets 142 and a plurality of throttling outlets 144. In some embodiments, the plurality of throttling inlets 142 are arranged in rows, in this case, in horizontal rows that are generally perpendicular to a longitudinal axis A of the cage 122. In the illustrated embodiment, the plurality of throttling inlets 142 comprises three rows. In other embodiments, more or less than three rows may be used. In yet other embodiments, the throttling inlets 142 may not form rows.

Similarly, the plurality of throttling outlets 144 are also arranged in rows. In some embodiments, the plurality of throttling outlets 144 are arranged in rows, in this case, in horizontal rows that are generally perpendicular to a longitudinal axis A of the cage 122. In the illustrated embodiment, the plurality of throttling outlets 144 comprises three rows. In other embodiments, more or less than three rows may be used. In yet other embodiments, the throttling outlets 144 may not form rows. The rows of throttling outlets 144 differ from rows of throttling inlets 142 in that the rows of throttling outlets 144 include two relatively closely spaced rows near a top of the cage 122 and a single row spaced from the first two and nearer to the bottom of the cage 122. In some cases this arrangement may produce more optimum downstream flow as the fluid exits the throttling outlets 144.

In some embodiments, the vena contracta 150 is at least partially defined by a sharp-edge 160. The sharp-edge 160 enhances velocity increase and thus the pressure recovery in the pressure recovery chamber 152. The sharp-edge 160 also enhances manufacturability, especially additive manufacturing such as 3D printing, by reducing or eliminating large overhangs.

In some embodiments, the throttling inlet 142 and/or the throttling outlet 144 may be diamond-shaped. The diamond-shape also enhances manufacturability. Furthermore, the diamond-shape maximizes flow area while minimizing stress concentrations.

In some embodiments, the throttling passageway 146 is chevron-shaped in cross-section. Similar to the sharp edge 160 and the diamond-shape described above, the chevron-shaped cross section of the throttling passageway enhances manufacturability while minimizing stress concentrations.

As discussed above, the throttling passageway 146 comprises a three-dimensional succession of throttling stages, including the radial direction or portion 146a, the axial direction or portion 146b, and the angular direction or portion 146c. The throttling passageway 146 may form three or more pressure reducing stages. In the illustrated embodiment, five pressure reducing stages 154a, 154b, 154c, 154d, 154e, are formed. In other embodiments, more or less than five pressure reducing stages may be formed in any individual throttling passageway 146. Moreover, different throttling passageways 146 in a given cage 122 may have a different number of throttling stages. More throttling stages may advantageously reduce wear of the trim material by producing greater reductions in fluid velocities and by reducing cavitation. Generally, more throttling stages are advantageous as the differential pressure across the trim increases. Conversely, if the differential pressure across the trim is smaller, fewer throttling stages reduce manufacturing complexity and thereby increase economic viability.

The cage 122 can be manufactured using Additive Manufacturing Technology, such as 3D printing, direct metal laser sintering, full melt powder bed fusion, etc. Using an Additive Manufacturing Technology process, the 3-dimensional design of cage 122 is divided into multiple layers, for example layers approximately 20-50 microns thick. A powder bed, such as a powder based metal, is then laid down representing the first layer of the design and a laser or electron beam sinters together the design of the first layer. A second powder bed, representing the second layer of the design, is then laid down over the first sintered layer and the second layer is sintered together. This continues layer after layer to form the completed cage 122.

Using an Additive Manufacturing Technology process to manufacture cages for control valves allows the freedom to produce passages having various shapes and geometries, and other features, that are not possible using current standard casting or drilling techniques. For example, as described above, cages used in liquid applications can be manufactured having passages that have axial, radial, and angular components. However, using standard manufacturing techniques, cages were limited to drilling or machining passages having relatively straight passageways.

The control valves and valve cages described herein advantageously minimize diameter and height of a cage and while also minimizing material content fraction of cage volume. Variations in the angles between surfaces, may be necessary to optimize additive manufacturing performance. The cross-sectional shapes of the throttling passageways may also vary. In particular, the throttling passageways may be circular, diamond-shaped, octagonal, square, polygonal, circular, oval, or combinations thereof. Furthermore, alternations of the number of throttling passageways in each rows or the number of rows may be employed. The succession of radial and axial flow directions of the throttling passageways may also occur in other embodiments. The ratio of flow cross sections between vena contracta and subsequent volumes may also vary. The basic geometrical shape of the cage itself may also vary, for example conical instead of cylindrical.

The foregoing list of aspects reflects a variety of the embodiments explicitly contemplated by the present disclosure. Those of ordinary skill in the art will readily appreciate that these aspects are neither limiting of the embodiments disclosed herein, nor exhaustive of all of the embodiments conceivable from the disclosure above, but are instead meant to be exemplary in nature.

What is claimed is:

1. A control valve, comprising:
   a body having a fluid inlet and a fluid outlet;
   a valve seat positioned in a passageway of the body between the fluid inlet and the fluid outlet;
   a valve plug positioned within the body and movable between a closed position, in which the valve plug sealingly engages the valve seat, and an open position, in which the valve plug is spaced away from the valve seat; and
   a cage disposed within the body adjacent the valve seat, the cage providing longitudinal guidance for the valve plug as the valve plug moves longitudinally within the cage, the cage including a cage wall having a plurality of throttling passageways each extending through the cage wall between only a single throttling inlet and only a single throttling outlet, each throttling passageway having a radial portion, an axial portion, and an angular portion between the throttling inlet and the throttling outlet, the passageway also including plurality of vena contracta positioned between the throttling inlet and the throttling outlet, and a plurality of pressure recovery chambers positioned between the throttling inlet and the throttling outlet; and
   wherein the throttling passageway forms a plurality of pressure reducing stages, and further wherein each of the pressure recovery chambers is bounded by an upstream pressure reducing stage and a downstream pressure reducing stage, the upstream pressure reducing stage being defined by a first selected one of the radial, axial, or angular portions, and the downstream pressure reducing stage being defined by a second selected one of the radial, axial, or angular portions, the first and second selected portions being dissimilar; and
   further wherein at least a portion of the throttling passageway is chevron-shaped relative to a radial cross-section.

2. The control valve of claim 1, wherein at least one vena contracta is sharp-edged.

3. The control valve of claim 1, wherein the cage wall has a plurality of throttling inlets and a plurality of throttling outlets.

4. The control valve of claim 3, wherein the plurality of throttling inlets is arranged in rows.

5. The control valve of claim 4, wherein the plurality of throttling inlets comprises three rows.

6. The control valve of claim 3, wherein the plurality of throttling outlets is arranged in rows.

7. The control valve of claim 6, wherein the plurality of throttling outlets comprises three rows.

8. The control valve of claim 1, wherein the throttling inlet is diamond-shaped.

9. The control valve of claim 1, wherein the throttling outlet is diamond-shaped.

10. The control valve of claim 1, wherein the throttling passageway is chevron-shaped in cross-section.

11. The control valve of claim 1, wherein the throttling passageway comprises a three-dimensional succession of throttling stages.

12. The control valve of claim 1, wherein the cage wall is manufactured with additive manufacturing techniques.

13. The control valve of claim 1, wherein the throttling passageway forms three or more pressure reducing stages.

14. The control valve of claim 1, wherein the throttling inlet has a cross-sectional shape that is dissimilar to a cross-sectional shape of the pressure recovery chambers, and wherein each of the pressure recovery chambers is bounded by only a single upstream pressure reducing stage and only a single downstream pressure reducing stage.

15. The control valve of claim 14, wherein the throttling inlet has a diamond shape in cross-section and the pressure recovery chambers having a chevron shape in cross-section.

16. The control valve of claim 1, wherein the throttling passageway includes five pressure reducing stages and four pressure recovery chambers.

17. A cage for a control valve, the cage comprising: a cage wall having a throttling inlet and a throttling outlet, which are connected by a throttling passageway, the throttling passageway having a radial portion, an axial portion, and an angular portion between the throttling inlet and the throttling outlet, the passageway also including plurality of vena contract and a plurality of pressure recovery chambers, wherein the throttling passageway further forms a plurality of pressure reducing stages positioned between the throttling inlet and the throttling outlet, a selected one of the pressure recovery chambers having a first pressure reducing stage positioned immediately upstream of the selected pressure recovery chamber and a second pressure reducing stage positioned immediately downstream of the selected pressure recovery chamber; and wherein the first pressure reducing stage is defined in part by a first selected one of the radial, axial, or angular portions, and the second pressure reducing stage being defined in in part by a second selected one of the radial, axial, or angular portions, the first and second selected portions being dissimilar; and further wherein at least a portion of the throttling passageway is chevron-shaped relative to a radial cross-section.

18. The cage of claim 17, wherein the cage wall has a plurality of throttling inlets and a plurality of throttling outlets, the plurality of throttling inlets being arranged in rows.

19. The cage of claim 18, wherein the plurality of throttling outlets is arranged in rows.

20. The cage of claim 17, wherein at least one of the throttling inlet and the throttling outlet is diamond-shaped.

21. The control valve of claim 17, wherein the throttling passageway is chevron-shaped in cross-section.

22. The control valve of claim 17, wherein the throttling passageway comprises a three-dimensional succession of throttling stages.

23. The control valve of claim 17, wherein the cage wall is manufactured with additive manufacturing techniques.

24. The control valve of claim 17, wherein each of the pressure recovery chambers is bounded by only a single upstream pressure reducing stage and only a single downstream pressure reducing stage.

25. The control valve of claim 24, wherein the throttling inlet has a cross-sectional shape that is dissimilar to a cross-sectional shape of the pressure recovery chambers.

* * * * *

UNITED STATES PATENT AND TRADEMARK OFFICE
CERTIFICATE OF CORRECTION

PATENT NO. : 11,598,449 B2
APPLICATION NO. : 16/931847
DATED : March 7, 2023
INVENTOR(S) : Jürgen Von Der Lieck et al.

It is certified that error appears in the above-identified patent and that said Letters Patent is hereby corrected as shown below:

On the Title Page

At item (57), Line 1, "valve a" should be -- valve includes a --.

In the Claims

At Column 6, Line 52, "outlet; and" should be -- outlet; --.

At Column 7, Line 33, "chevron shape" should be -- chevron-shape --.

At Column 8, Lines 1-2, "vena contract" should be -- vena contracta --.

At Column 8, Line 13, "in in" should be -- in --.

Signed and Sealed this
Thirtieth Day of April, 2024

*Katherine Kelly Vidal*

Katherine Kelly Vidal
*Director of the United States Patent and Trademark Office*